United States Patent
Yang

(10) Patent No.: US 9,391,528 B2
(45) Date of Patent: Jul. 12, 2016

(54) ACTIVE CLAMP CIRCUITS FOR FLYBACK POWER CONVERTERS

(71) Applicant: SYSTEM GENERAL CORPORATION, New Taipei (TW)

(72) Inventor: Ta-Yung Yang, Milpitas, CA (US)

(73) Assignee: FAIRCHILD (TAIWAN) CORPORATION, Taipei (TW)

(*) Notice: Subject to any disclaimer, the term of this patent is extended or adjusted under 35 U.S.C. 154(b) by 117 days.

(21) Appl. No.: 14/076,404

(22) Filed: Nov. 11, 2013

(65) Prior Publication Data
US 2014/0185333 A1      Jul. 3, 2014

Related U.S. Application Data

(60) Provisional application No. 61/746,140, filed on Dec. 27, 2012.

(51) Int. Cl.
*H02M 1/32* (2007.01)
*H02M 3/335* (2006.01)

(52) U.S. Cl.
CPC .................. *H02M 3/33569* (2013.01)

(58) Field of Classification Search
CPC ... H02M 3/335; H02M 1/32; H02M 3/33507; H02M 3/33523; H02M 3/33569

USPC ................ 363/21.12, 21.15, 21.16, 56.11, 97
See application file for complete search history.

(56) References Cited

U.S. PATENT DOCUMENTS

| | | | |
|---|---|---|---|
| 5,570,278 A | 10/1996 | Cross | |
| 6,069,803 A | 5/2000 | Cross | |
| 7,486,528 B2 * | 2/2009 | Yang | 363/21.12 |
| 2005/0285661 A1 * | 12/2005 | Wittenbreder, Jr. | 327/434 |
| 2011/0305048 A1 | 12/2011 | Yang et al. | |

* cited by examiner

*Primary Examiner* — Gary L Laxton
(74) *Attorney, Agent, or Firm* — McClure, Qualey & Rodack, LLP

(57) ABSTRACT

An active clamp circuit for a flyback power converter is provided. The active clamp circuit includes a power transistor, a capacitor, a high-side transistor driver, a charge-pump circuit, and a controller. The power transistor is coupled in series with a capacitor to develop an active-clamper. The active-damper is coupled in parallel with a primary winding of a transformer of the flyback power converter. The high-side transistor driver is coupled to drive the power transistor. The charge-pump circuit is coupled to a voltage source and the high-side transistor driver to provide a power supply to the high-side transistor driver. The controller generates a control signal coupled to control the high-side transistor driver. The control signal is generated in response to a demagnetizing time of the transformer.

7 Claims, 11 Drawing Sheets

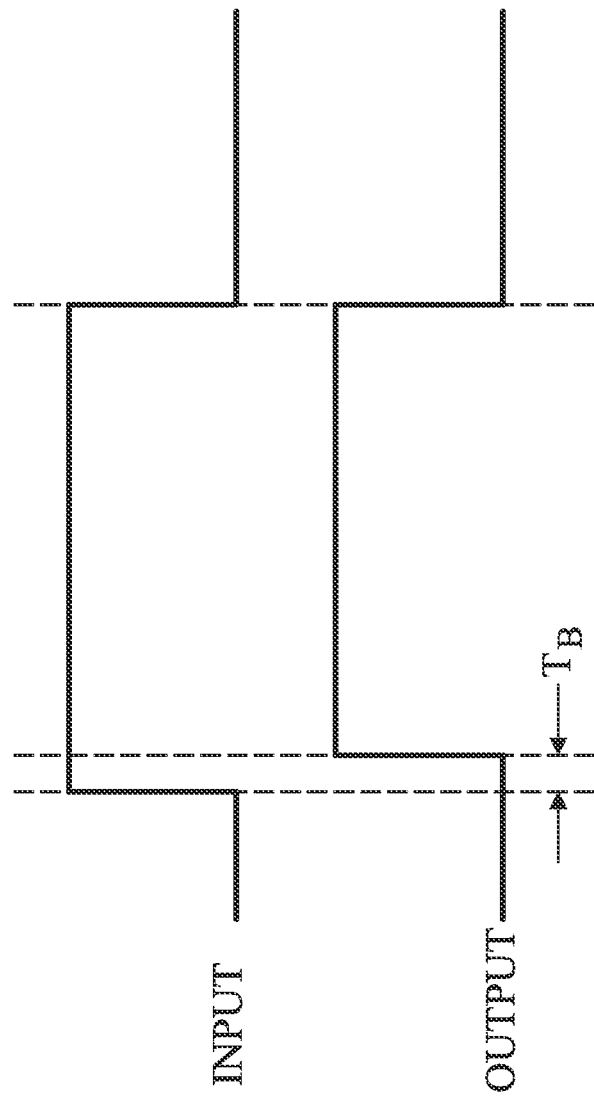

ACTIVE CLAMP CIRCUITS FOR FLYBACK POWER CONVERTERS

CROSS REFERENCE TO RELATED APPLICATIONS

This application claims the benefit of U.S. Provisional Application No. 61/746,140, filed on Dec. 27, 2012, the contents of which are incorporated herein by reference.

BACKGROUND OF THE INVENTION

1. Field of the Invention

The invention relates to an active clamp circuit for flyback power converter operated in a DCM (discontinuous current mode) and a CCM (continuous current mode).

2. Description of the Related Art

A power converter can be operated in higher switching frequency for reducing the size of its transformer. The related prior arts can be found in U.S. Pat. No. 5,570,278 titled "Clamped Continuous Flyback Power Converter", U.S. Pat. No. 6,069,803 titled "Offset Resonance Zero Voltage Switching Flyback Converter", and U.S. patent application No. 20110305048 titled "Active-clamp circuit for quasi-resonant flyback power converter".

BRIEF SUMMARY OF THE INVENTION

The objective of this invention is to improve the efficiency of the power converter by recycling the leakage inductance's energy of the transformer.

An exemplary embodiment of an active clamp circuit for a flyback power converter is provided. The active clamp circuit comprises a power transistor, a capacitor, a high-side transistor driver, a charge-pump circuit, and a controller. The power transistor is coupled in series with a capacitor to develop an active-clamper. The active-clamper is coupled in parallel with a primary winding of a transformer of the flyback power converter. The high-side transistor driver is coupled to drive the power transistor. The charge-pump circuit is coupled to a voltage source and the high-side transistor driver to provide a power supply to the high-side transistor driver. The controller generates a control signal coupled to control the high-side transistor driver. The control signal is generated in response to a demagnetizing time of the transformer.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 7B shows waveform of main signals of the delay circuit in FIG. 7A;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
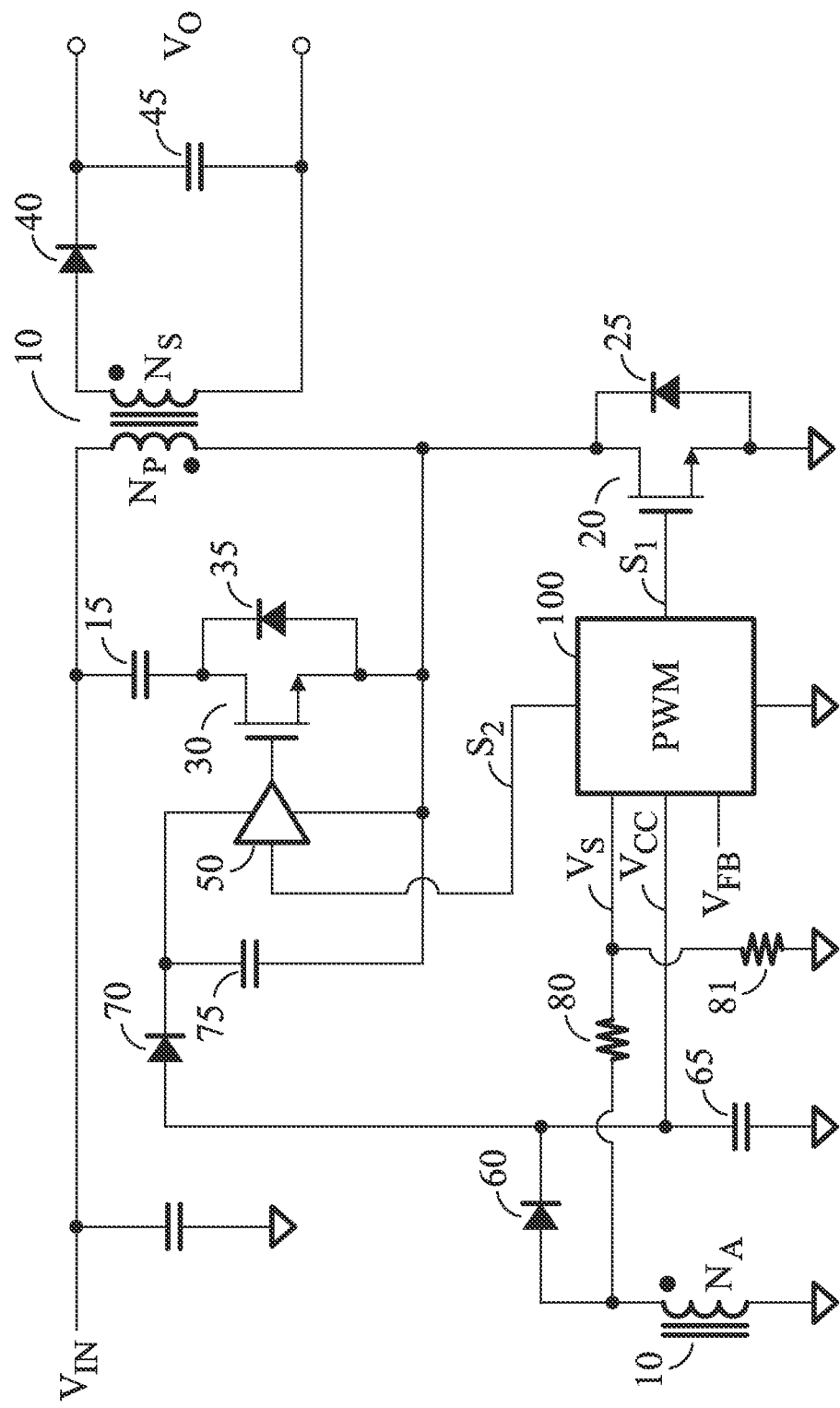
FIG. 1 is an exemplary embodiment of a flyback power converter in accordance with the present invention.

FIG. 1 is an exemplary embodiment of the flyback power converter in accordance with the present invention. In the embodiment, the power converter in FIG. 1 is a flyback power converter. A transistor (also referred to as a main-power transistor) 20 is coupled to a primary winding $N_P$ of a transformer 10 for switching the primary winding N. A diode 25 is coupled in parallel with the transistor 20. The transistor 20 is used to switch the transformer 10 for regulating an output voltage $V_O$ at an output of the power converter through a rectifier 40 and a capacitor 45 which are coupled to a secondary winding $N_S$ of the transformer 10. A PWM (pulse width modulation) controller (PWM) 100 generates a switching signal $S_1$ coupled to drive the transistor 20. The switching signal $S_1$ is generated in accordance with a feedback signal $V_{FB}$. The feedback signal $V_{FB}$ is correlated to the output voltage $V_O$ of the power converter. The transformer 10 includes an auxiliary winding $N_A$ for generating a power source $V_{CC}$ via a rectifier 60 and a capacitor 65 which are coupled to the auxiliary winding $N_A$. The power source $V_{CC}$ is connected to supply power to the PWM controller 100. Resistors 80 and 81 are coupled to the auxiliary winding $N_A$ for generating a detection signal $V_S$ coupled to the PWM controller 100. The detection signal $V_S$ represents a reflected signal of the transformer 10. The reflected signal has the information of the output voltage $V_O$ during the demagnetized period of the transformer 10. Furthermore, the reflected signal includes the information of the demagnetizing time of the transformer 10. A power transistor 30 is coupled in series with a capacitor 15 to develop an active-clamper. The active-clamper is coupled in parallel with the primary winding $N_P$ of the transformer 10. A diode 35 is coupled in parallel with the power transistor 30. A high-side transistor driver 50 is coupled to drive the power transistor 30. A charge-pump circuit is coupled to the voltage source $V_{CC}$ and the high-side transistor driver 50 to provide a power supply to the high-side transistor driver 50. The charge-pump circuit is developed by a diode 70 coupled to the voltage source $V_{CC}$ and a capacitor (also referred to as a charge-pump capacitor) 75 coupled to the diode 70 in series. The PWM controller 100 generates a control signal $S_2$ for controlling the high-side transistor driver 50. The control signal $S_2$ is generated in response to the discharging time (demagnetizing time) of the transformer 10. The control signal $S_2$ can be turned on once the switching signal $S_1$ is turned off The detection signal $V_S$ is utilized to detect the discharging time of the transformer 10. The pulse width of the control signal $S_2$ is generated shorter than the discharging time of the transformer 10. In the embodiment, an active clamp circuit is composed of at least the power transistor 30, the capacitor 15, the high-side transistor driver 50, the diode 70, the capacitor 75, the PWM controller 100.

Figure 2:
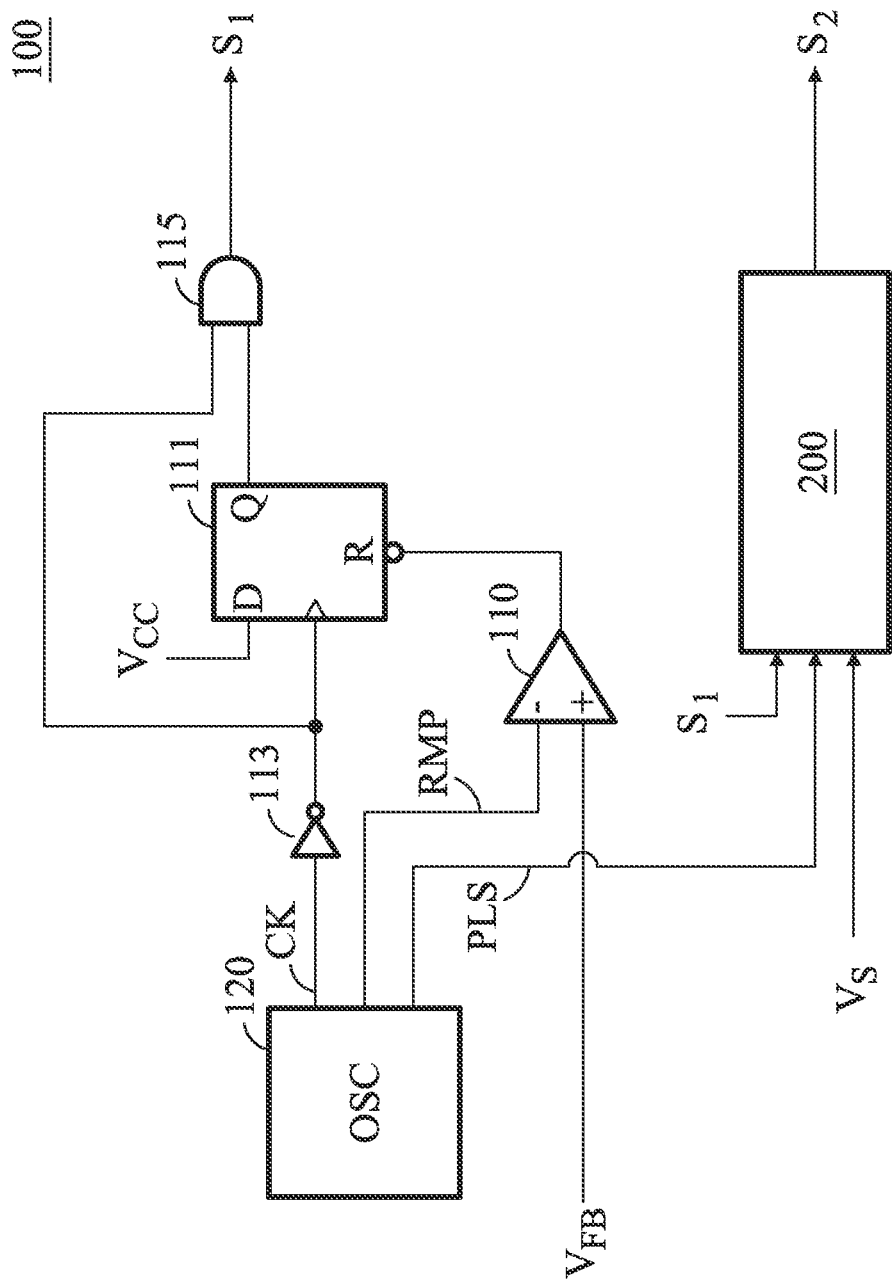
FIG. 2 is an exemplary embodiment of a PWM controller of the power converter in FIG. 1.

FIG. 2 is an exemplary embodiment of the PWM controller 100 in accordance with the present invention. The PWM controller 100 includes an oscillation circuit (OSC) 120 which generates a clock signal CK, a ramp signal RMP, and a pulse signal PLS. The clock signal CK is coupled to turn on the switching signal $S_1$ through an inverter 113, a flip-flip 111, and an AND gate 115. The comparator 110 compares the ramp signal RMP with the feedback signal $V_{FB}$ for generating a signal coupled to turn off the switching signal $S_1$ for the pulse width modulation (PWM). The pulse signal PLS, the detection signal $V_S$, and the switching signal $S_1$ are coupled to a circuit 200 for generating the control signal $S_2$.

Figure 3:
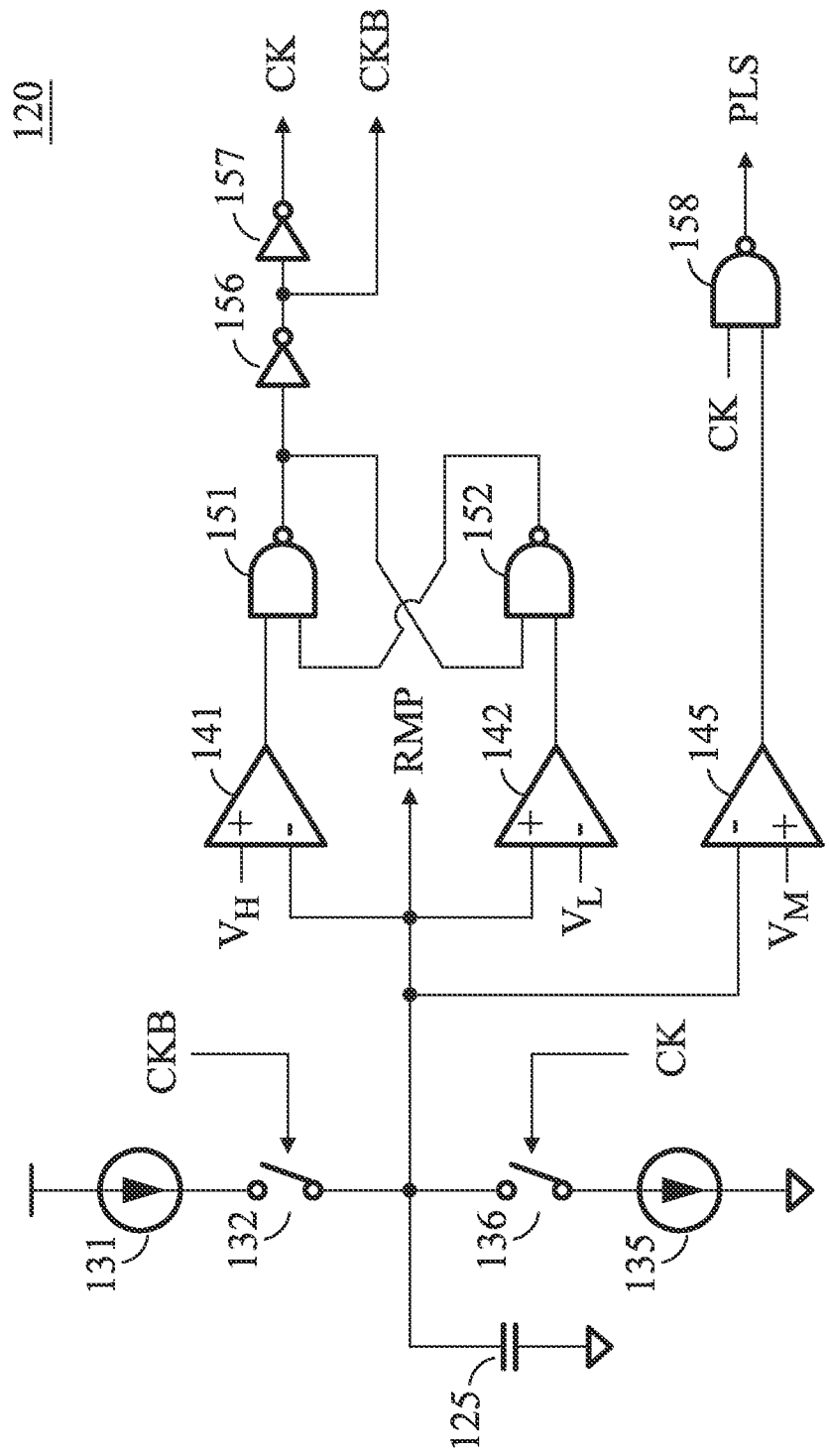
FIG. 3 is an exemplary embodiment of an oscillation circuit of the PWM controller in FIG. 2.

FIG. 3 is an exemplary embodiment of the oscillation circuit 120 in accordance with the present invention. Current sources 131 and 135 are utilized to charge and discharge a capacitor 125 through switches 132 and 136, respectively. The ramp signal RMP is generated in the capacitor 125. The ramp signal RMP is further coupled to comparators 141, 142, and 145. The comparator 141 has a trip-point voltage $V_H$. The comparator 142 has a trip-point voltage $V_L$. The comparator 145 has a threshold voltage $V_M$, in which the levels of these voltage is $V_H > V_M > V_L$.

NAND gates 151 and 152 form a latch circuit coupled to receive output signals of the comparators 141 and 142. The latch circuit and inverters 156 and 157 operate together to generate the clock signals CK and CKB, wherein the clock signal CK is inverse to the clock signal CKB through the inverter 157. The clock signal CK is applied to control the switch 136 for the discharging of the capacitor 125. The clock signal CKB is used for controlling the switch 132 for the charging of the capacitor 125. An output signal of the comparator 145 and the clock CK are applied to an NAND gate 158 to generate the pulse signal PLS.

Figure 4:
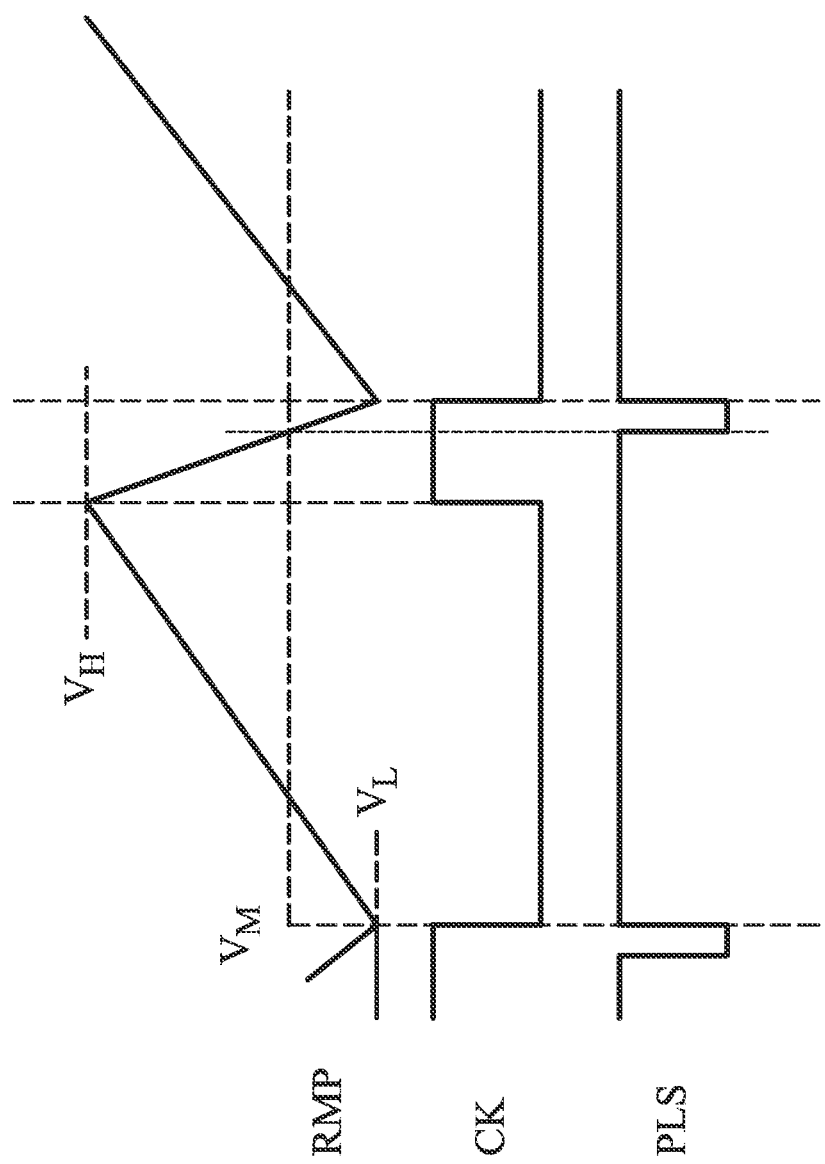
FIG. 4 shows waveforms of a ramp signal, a clock signal, and a pulse signal of the oscillation circuit in FIG. 3.

FIG. 4 shows the waveforms of the ramp signal RMP, the clock signal CK, and the pulse signal PLS. When the ramp signal RMP is in the range between the trip-point voltage $V_L$ and the trip-point voltage $V_H$, the pulse signal PLS is enabled. When the ramp signal RMP is decreased to be less than the threshold voltage $V_M$ and in the range between the threshold voltage $V_M$ and trip-point voltage $V_L$, the pulse signal PLS is disabled.

Figure 5:
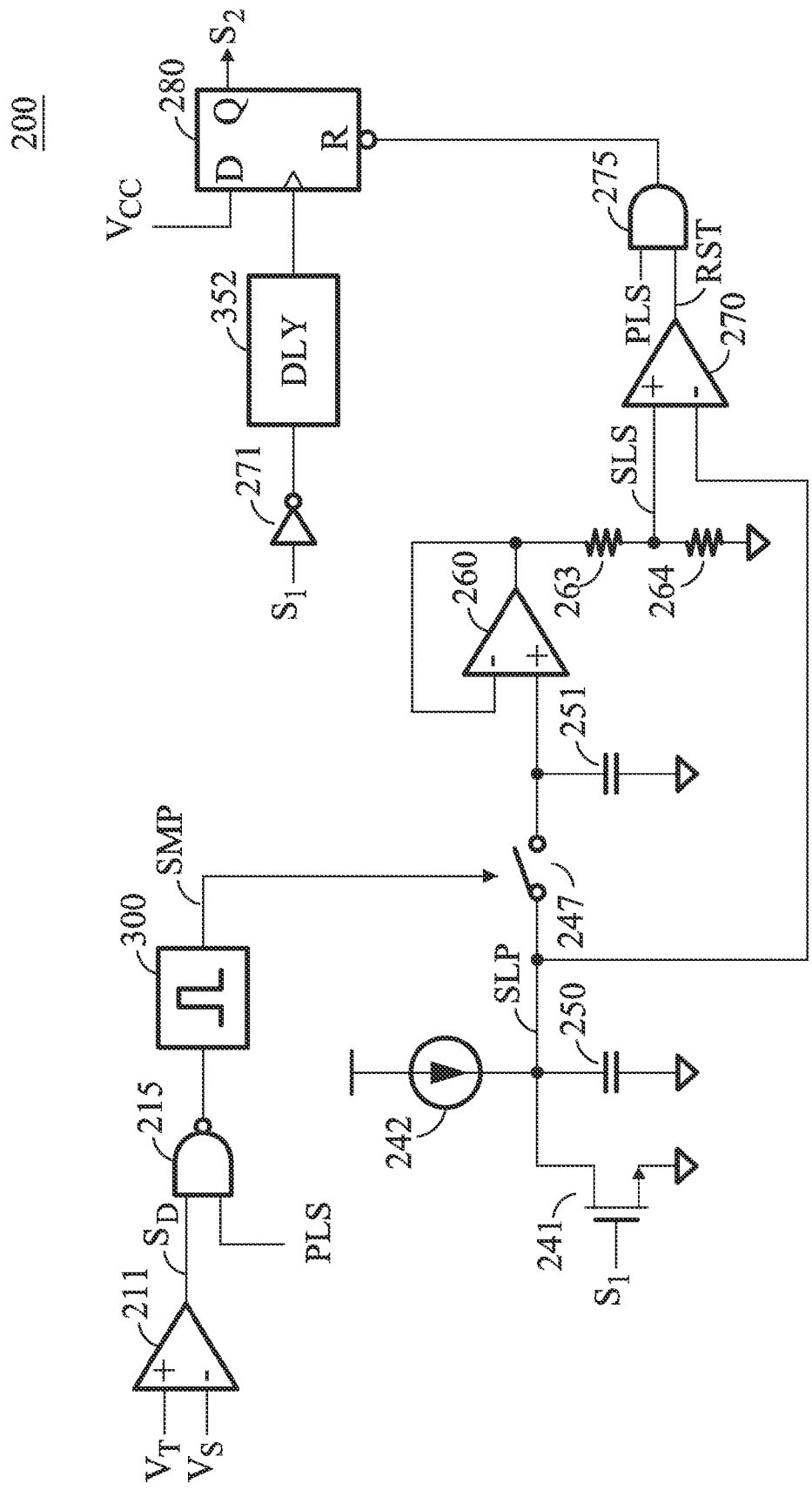
FIG. 5 is an exemplary embodiment of a circuit of the PWM controller in FIG. 2.

FIG. 5 is an exemplary embodiment of the circuit 200 in accordance with the present invention. A capacitor 250 will be charged by a constant current source 242 and generate a slope signal SLP once the switching signal $S_1$ is turned off (logic low). The capacitor 250 will be discharged via a transistor 241 when the switching signal $S_1$ is turned on (logic high). A comparator 211 will generate a discharging-time signal $S_D$ when the detection signal $V_S$ is lower than a threshold $V_T$. The discharging-time signal $S_D$ represents the period of the discharging time of the transformer 10 when the power converter is operated in a DCM (discontinuous current mode). Through an NAND gate 215 and a pulse generator 300, the discharging-time signal $S_D$ and the pulse signal PLS are coupled to generate a sample signal SMP to control a switch 247 for sampling the slope signal SLP of the capacitor 250 to a capacitor 251. The signal level of the capacitor 251 represents the period of the discharging time of the transformer 10. The pulse signal PLS is used for determining the discharging time when the power converter is operated in a CCM. The CCM operation means that the transformer is not fully demagnetized before the start of the next switching cycle. Therefore, the pulse signal PLS is utilized to generate the sample signal SMP before the switching signal $S_1$ is on.

The switching signal $S_1$ is coupled to generate the control signal $S_2$ via an inverter 271, a delay circuit (DLY) 352, and a flip-flop 280. Therefore, when the switching signal $S_1$ is turned off, the control signal $S_2$ will be turned on after a delay. The capacitor 251 is coupled to generate a level-shift signal SLS through a buffer amplifier 260 and resistors 263 and 264. A comparator 270 compares the level-shift signal SLS with the slope signal SLP to generate a reset signal RST before the end of the discharging time of the transformer 10. The reset signal RST and the pulse signal PLS are coupled to turn off the control signal $S_2$ via an AND gate 275 and the flip-flop 280.

Figure 6A:
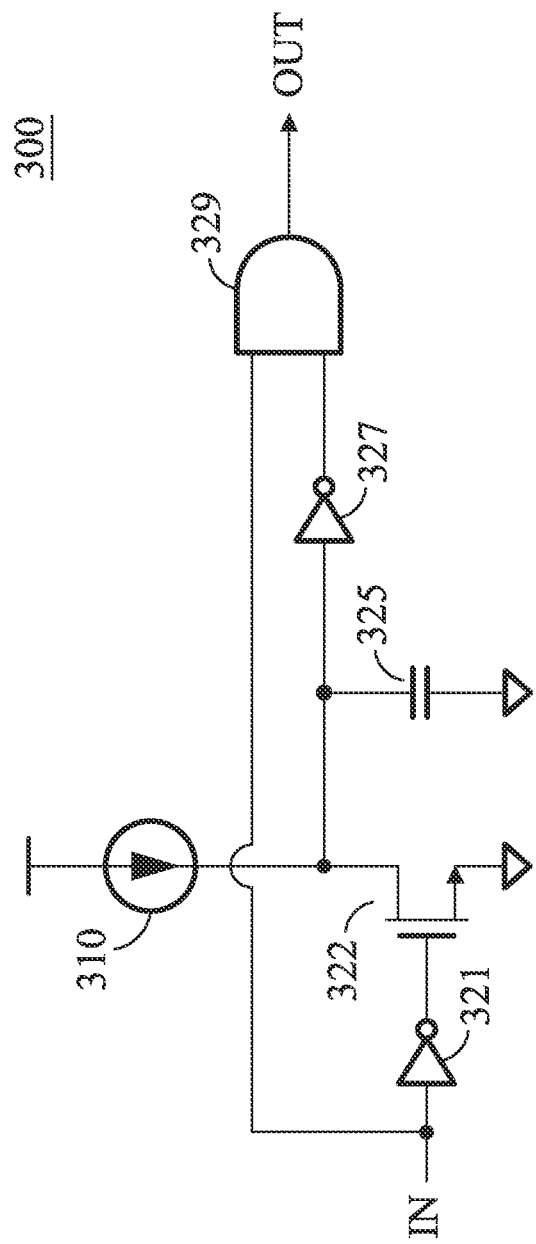
FIG. 6A is an exemplary embodiment of a pulse generator of the circuit in FIG. 5.
Figure 6B:
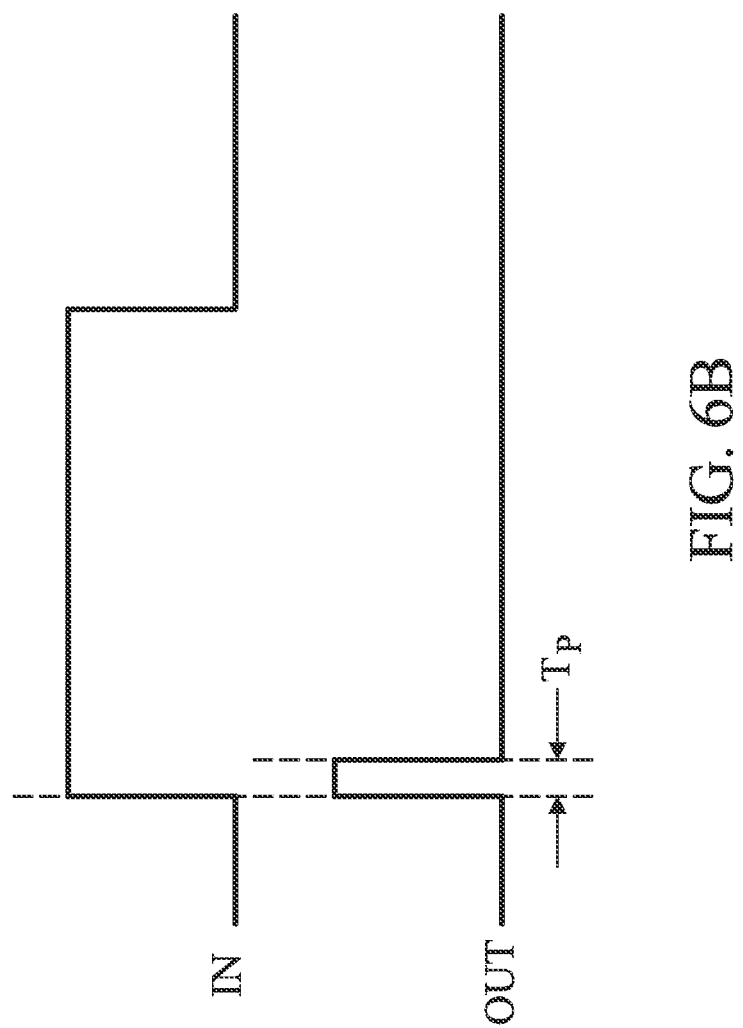
FIG. 6B shows waveforms of main signals of the pulse generator in FIG. 6A.

FIG. 6A and FIG. 6B shows a reference circuit schematic and the waveforms the signals of the pulse generator 300. The pulse generator 300 includes a current source 310, an inverter 321, a transistor 322, a capacitor 325, an inverter 327, and an AND gate 329. The current source 310 is coupled to charge the capacitor 325. The transistor 322 is coupled to discharge the capacitor 325. A signal IN is coupled to control the transistor 322 through the inverter 321. The signal IN is further connected to an input of the AND gate 329. Another input of the AND gate 329 is coupled to the capacitor 235 via the inverter 327. An output pulse signal OUT is generated at the output of the AND gate 329. The pulse width of the output pulse signal OUT is determined by the current of the current source 310 and the capacitance of the capacitor 325. In the embodiment, the signal IN is provided from the output of the NAND gate 215 shown in FIG. 5, and the output pulse signal OUT is provided to serve as the sample signal SMP shown in FIG. 5. In FIG. 6A, the period of the pulse width of the output pulse signal OUT is represented by $T_P$, as shown FIG. 6B.

Figure 7A:
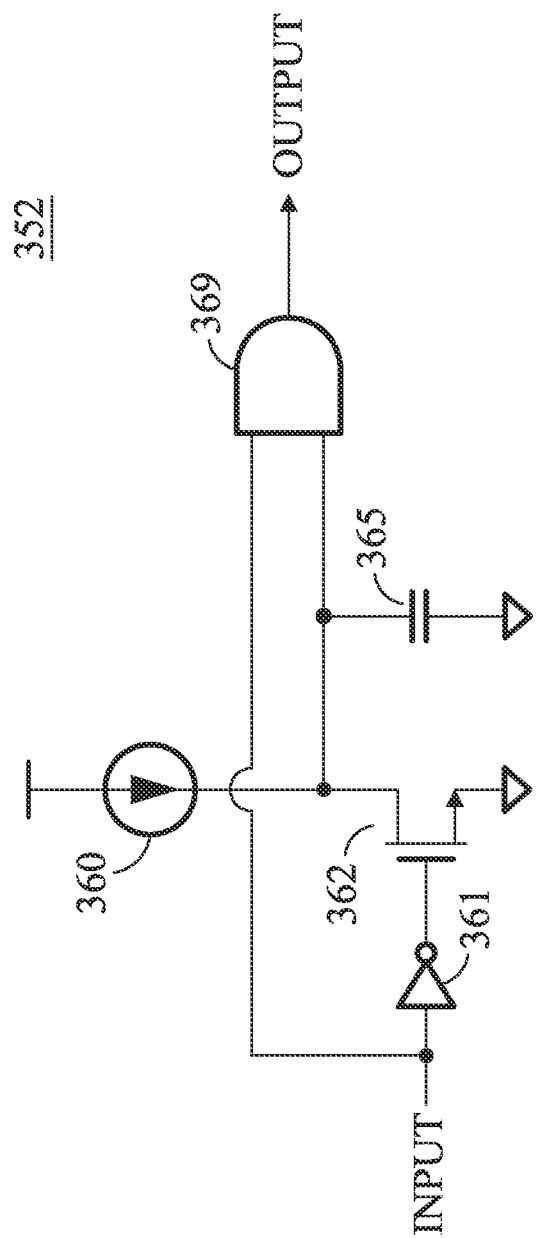
FIG. 7A is a exemplary embodiment of the delay circuit of the circuit in FIG. 5.

FIG. 7A and FIG. 7B shows a reference circuit schematic and the waveform of the signals of the delay circuit 352. The delay circuit 352 includes a current source 360, an inverter 361, a transistor 362, a capacitor 365, and an AND gate 369. A signal INPUT is supplied to the inverter 361 and one input of the AND gate 369. The output of the inverter 361 is coupled to a gate of the transistor 362. A drain of the transistor 362 and one terminal of the capacitor 365 are coupled to another input of the AND gate 369 and further to the current source 360. A source of the transistor 362 and the other terminal of the capacitor 365 are coupled to the ground. A signal OUTPUT is generated at the output of the AND gate 369. The signal OUTPUT is enabled in response to the rising edge of the signal INPUT after a delay time $T_B$ (shown in FIG. 6B). The delay time $T_B$ is determined according to the current value provided by the current source 360 and the capacitance of the capacitor 365. In the embodiment, the signal INPUT is provided from the output of the inverter 271 shown in FIG. 5, and the signal OUTPUT is provided to the flip-flop 280 shown in FIG. 5.

Figure 8:
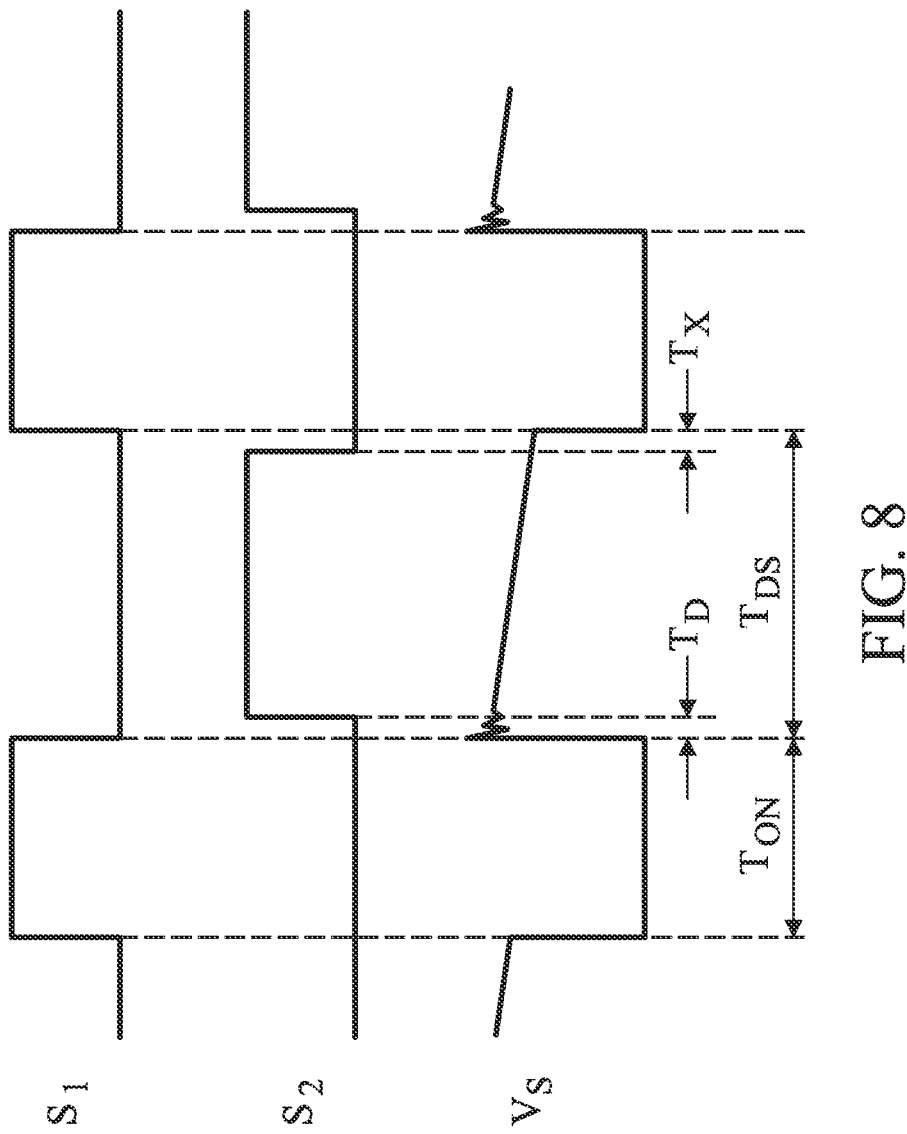
FIG. 8 shows waveforms of a switching signal, a control signal, and a detection signal $V_S$ when the flyback power converter operates in a CCM (continuous current mode)

FIG. 8 shows the waveforms of the switching signal $S_1$, the control signal $S_2$ and the detection signal $V_S$ operated in the CCM. When the switching signal $S_1$ is turned off, the control signal $S_2$ will be tuned on after a delay $T_D$. The period of the delay $T_D$ is determined by the delay circuit 352 shown in FIG. 5. The pulse width of the control signal $S_2$ is only a percentage of the period of the discharging time (demagnetizing time) $T_{DS}$. This percentage and the period $T_X$ are determined by the attenuation rate of the resistors 263 and 264 shown in FIG. 5. As shown in FIG. 8, the control signal $S_2$ is turned off before the discharging time (demagnetizing time) $T_{DS}$ ends, in other words, the control signal $S_2$ is turned off before the transformer 10 is fully demagnetized. A period $T_{ON}$ represents the on-time of the switching signal $S_1$.

Figure 9:
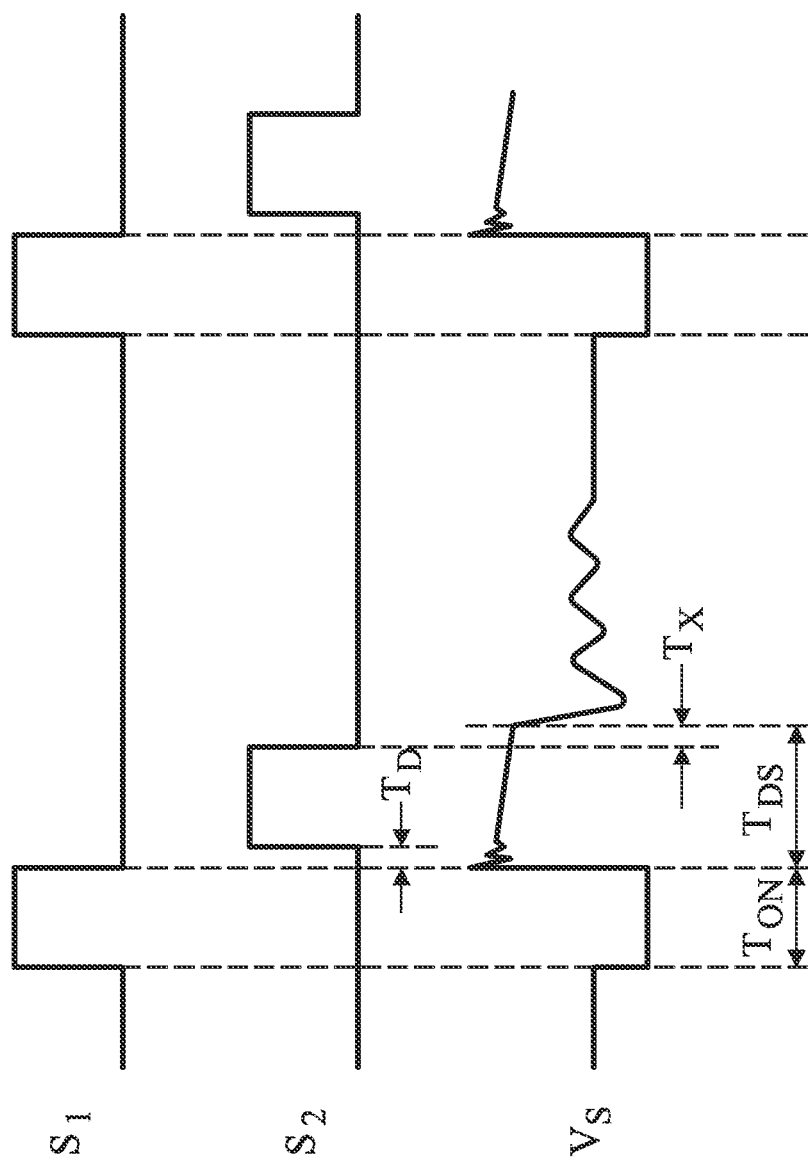
FIG. 9 shows waveforms of a switching signal, a control signal, and a detection signal $V_S$ when the flyback power converter operates in a DCM (discontinuous current mode).

FIG. 9 shows the waveforms of the switching signal $S_1$, the control signal $S_2$ and the detection signal $V_S$ operated in the DCM. When the switching signal $S_1$ is turned off, the control signal $S_2$ will be tuned on after a delay $T_D$. The period of the delay $T_D$ is determined by the delay circuit 352 shown in FIG. 5. The pulse width of the control signal $S_2$ is only a percentage of the period of the discharging time (demagnetizing time) $T_{DS}$. This percentage and the period $T_X$ are determined by the attenuation rate of the resistors 263 and 264 shown in FIG. 5. As shown in FIG. 9, the control signal $S_2$ is turned off before the discharging time (demagnetizing time) $T_{DS}$ ends, in other words, the control signal $S_2$ is turned off before the transformer 10 is fully demagnetized. A period $T_{ON}$ represents the on-time of the switching signal $S_1$.

According to the embodiments, the period of the discharging time (of the transformer) of the previous switching cycle determines the pulse width of the control signal $S_2$. Besides, the control signal $S_2$ will be turned off before the turned-on of the switching signal S1 for the CCM and DCM operations. The efficiency of the power converter will be improved by cycling the leakage inductance's energy of the transformer to the output of the power converter.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An active clamp circuit for a flyback power converter, comprising:
    a power transistor coupled in series with a capacitor to develop an active-clamper, wherein the active-clamper is coupled in parallel with a primary winding of a transformer of the flyback power converter;
    a high-side transistor driver coupled to drive the power transistor;
    a charge-pump circuit coupled to a voltage source and the high-side transistor driver to provide a power supply to the high-side transistor driver; and
    a controller generating a control signal coupled to control the high-side transistor driver;
    wherein the control signal is generated in response to a demagnetizing time of the transformer,
    wherein the demagnetizing time is obtained according to a reflected signal and a threshold, and the reflected signal is generated from an auxiliary winding of the transformer; and
    wherein a pulse width of the control signal is a percentage of the demagnetizing time of the transformer, and the percentage of the demagnetizing time is determined by an attenuation rate of a voltage divider.

2. The active clamp circuit as claimed in claim 1, wherein the controller further generates a switching signal to control a main-power transistor of the flyback power converter for regulation of an output voltage of the flyback power converter, and the main-power transistor is coupled to switch the primary winding of the transformer.

3. The active clamp circuit as claimed in claim 2, wherein the control signal is turned on after a delay once the switching signal is turned off.

4. The active clamp circuit as claimed in claim 1, wherein the control signal is turned off before the transformer is fully demagnetized.

5. The active clamp circuit as claimed in claim 1, wherein the charge-pump circuit comprises:
    a diode coupled to the voltage source; and
    a charge-pump capacitor coupled to the diode in series;
    wherein the charge-pump capacitor is connected to the high-side transistor driver.

6. The active clamp circuit as claimed in claim 1, wherein the voltage divider attenuates a slop signal which is generated when a switching signal is at an off-state.

7. The active clamp circuit as claimed in claim 6, wherein the switching signal is coupled to control a main-power transistor of the flyback power converter for regulation of an output voltage of the flyback power converter, and the main-power transistor is coupled to switch the primary winding of the transformer.

* * * * *